US012540067B2

(12) United States Patent
Paxton et al.

(10) Patent No.: US 12,540,067 B2
(45) Date of Patent: Feb. 3, 2026

(54) DECORATIVE DISPENSER COVER

(71) Applicant: Pour Impressions, Santa Ana, CA (US)

(72) Inventors: Michael Paxton, Santa Ana, CA (US); Pedro Adame, Santa Ana, CA (US); Jason Venable, Santa Ana, CA (US); Antonio Adame, Santa Ana, CA (US)

(73) Assignee: Pour Impressions, Santa Ana, CA (US)

( * ) Notice: Subject to any disclaimer, the term of this patent is extended or adjusted under 35 U.S.C. 154(b) by 180 days.

(21) Appl. No.: 18/437,705

(22) Filed: Feb. 9, 2024

(65) Prior Publication Data

US 2024/0327192 A1 Oct. 3, 2024

Related U.S. Application Data

(60) Provisional application No. 63/484,282, filed on Feb. 10, 2023.

(51) Int. Cl.
*B67D 1/08* (2006.01)

(52) U.S. Cl.
CPC .. *B67D 1/0872* (2013.01); *B67D 2210/00144* (2013.01)

(58) Field of Classification Search
CPC .................... B67D 1/0872; B67D 2210/00144
See application file for complete search history.

(56) References Cited

U.S. PATENT DOCUMENTS

| | | | |
|---|---|---|---|
| 1,008,233 | A | 11/1911 | Zabel et al. |
| 1,056,735 | A | 3/1913 | Buckingham |
| 2,579,769 | A | 12/1951 | Tyler |
| 4,252,160 | A | 2/1981 | Numbers |
| 5,125,577 | A | 6/1992 | Frankel |
| D475,887 | S | 6/2003 | Vosrejs |
| D629,648 | S | 12/2010 | McDonald |
| D669,293 | S | 10/2012 | Doty |
| 8,371,514 | B2 | 2/2013 | Finell |
| D746,632 | S | 1/2016 | Ploss |
| 9,763,544 | B2 | 9/2017 | Henderson et al. |
| 10,676,338 | B2 | 6/2020 | Ploss |
| D907,957 | S | 1/2021 | Reiser et al. |
| 11,185,194 | B2 | 11/2021 | Gharibian |

(Continued)

FOREIGN PATENT DOCUMENTS

| | | |
|---|---|---|
| DE | 1743917 | 4/1957 |

*Primary Examiner* — Jeremy Carroll
(74) *Attorney, Agent, or Firm* — Welsh Flaxman & Gitler LLC

(57) ABSTRACT

A decorative dispenser cover providing an aesthetically desirable accessory for use in conjunction with a beverage dispenser comprises a fixed frame member that includes a fixed frame body member shaped and dimensioned to fit about a dispensing faucet of a beverage dispenser. The decorative dispenser cover also includes a rotating frame member pivotally coupled to the fixed frame body member such that the rotating frame member moves in a coordinated manner. The rotating frame member includes a rotating frame body member of an aesthetically pleasing appearance. A linkage mechanism controls movement of the fixed frame body member relative to the rotating frame body member. In use, the rotating frame body member rotates relative to the fixed frame body member between a first position and a second position.

17 Claims, 13 Drawing Sheets

(56) References Cited

U.S. PATENT DOCUMENTS

| | | | | |
|---|---|---|---|---|
| 2004/0163288 | A1* | 8/2004 | Bydalek | B67D 1/0872<br>40/332 |
| 2005/0029309 | A1* | 2/2005 | Forsyth | B67D 1/06<br>222/400.7 |
| 2011/0005640 | A1* | 1/2011 | Benbaruj | B67D 1/1466<br>222/505 |
| 2017/0043995 | A1* | 2/2017 | Reichelt | B67D 1/0855 |

* cited by examiner 210
216
212
302
300
222
306
226a
226
214
226b
PUSH ARM
304

ROTATING HORNS ARE THE ANIMATING FEATURE OF THIS DESIGN. THERE IS NO ROATATING JAW
PUSH BAR BACK, HORNS ROTATE FORWARD 242
242b
236b
242a
228
238
236
224
236a
ARM NORMALLY FORWARD
NO BOTTOM JAW
218

TORSION SPRING RETURNS ARM
ARM BACK
232

DECORATIVE DISPENSER COVER

REFERENCE TO RELATED APPLICATION

This application claims the benefit of U.S. Provisional Patent Application Ser. No. 63/484,282, entitled "DECORATIVE DISPENSER COVER," filed Feb. 10, 2024, which is incorporated herein by reference.

BACKGROUND OF THE INVENTION

1. Field of the Invention

The invention relates to decorative covers for dispensers.

2. Background

Beverage dispensers, whether they be a soda dispenser at a local convenience store or a beer tap at a local brewery, are commonly customized to draw a consumer's attention to a specific product. For example, soda dispensers will commonly include signage adjacent to the tap and beer taps commonly include different handles associated with specific beers or breweries. However, such signage and handles are limited in their ability to attract the attention of consumers.

A need, therefore, exists for improved decorative items that may be readily associated with beverage dispensers and effectively entice consumers to purchase the beverages associated with the decorative items. At least one specification heading is required. Please delete this heading section if it is not applicable to your application. For more information regarding the headings of the specification, please see MPEP 608.01(a).

SUMMARY OF THE INVENTION

In an aspect a decorative dispenser cover provides an aesthetically desirable accessory for use in conjunction with a beverage dispenser. The decorative dispenser cover comprises a fixed frame member that includes a fixed frame body member shaped and dimensioned to fit about a dispensing faucet of a beverage dispenser. The fixed frame body member includes a first opening allowing for access to an outlet of the beverage dispenser and a second opening for access to a flow actuator and tap handle of the beverage dispenser. The fixed frame member also includes coupling members for selectively attaching the fixed frame body member, and ultimately the decorative dispenser cover itself, to the beverage dispenser in a self-supported manner allowing use thereof as described below. The decorative dispenser cover also includes a rotating frame member pivotally coupled to the fixed frame body member such that the rotating frame member moves in a coordinated manner. The rotating frame member includes a rotating frame body member of an aesthetically pleasing appearance. The rotating frame body member includes a first end pivotally coupled to the fixed frame body member and free second end that moves relative to the fixed frame body member. A linkage mechanism controls movement of the fixed frame body member relative to the rotating frame body member. In use, the rotating frame body member rotates relative to the fixed frame body member between a first position and a second position.

In some embodiments the linkage mechanism includes a spring and gear mechanism that links the rotating frame body member to the movement of the flow actuator and tap handle.

In some embodiments the spring and gear mechanism includes a torsion spring extending between the fixed frame body member and the rotating frame body member to bias the rotating frame body member to the first position.

In some embodiments the decorative dispenser cover further includes magnets and magnetic contacts positioned at specific locations along the respective rotating frame body member and the fixed frame body member such that the magnets and steel contacts are brought adjacent each other such that magnetic attraction therebetween causes the rotating frame body member to be held in position.

In some embodiments the spring and gear mechanism further includes a gearing system that controls movement of the rotating frame body member, the gearing system includes a drive lever having a first end selectively coupled to an actuating lever of the beverage dispenser and a second end with a linkage arm pivotally secured thereto for selectively controlling rotating frame body member.

In some embodiments the spring and gear mechanism further includes a driving gear connected to a rotating lever of the rotating frame member, and the rotating lever includes a first end secured to the rotating frame body member and a second end secured to the linkage arm, the second end of the drive lever moves between a first position when the actuating lever is back and a valve of the faucet is closed and a second position when the actuating lever is pulled forward and the valve of the faucet is opened.

In some embodiments the coupling members include a plurality of clips extending from a rear surface of the fixed frame body member.

In some embodiments the linkage mechanism includes a coupling arm secured directly to the flow actuator and a lever assembly.

In some embodiments the fixed frame body member includes a first fixed frame portion and a second fixed frame portion, wherein the first fixed frame portion and the second fixed frame portion are constructed such that they may be selectively coupled together.

In some embodiments inwardly facing coupling surfaces of the first fixed frame portion and the second fixed frame portion are provided with magnets that allow the first fixed frame portion and the second fixed frame portion to be selectively coupled.

In some embodiments the decorative dispenser cover further includes a universal insert and a draw latch providing for secure attachment of the decorative dispensing cover to a neck of the faucet.

In some embodiments the rotating frame body member includes a first end pivotally coupled to the fixed frame body member and free second end that moves relative to the fixed frame body member, the first end of the rotating frame body member includes pivot pins extending from opposite side of the rotating frame member, the pivot pins are shaped and dimensioned for positioning within pivot apertures of the fixed frame body member.

In some embodiments the linkage mechanism includes a coupling arm adapted for to be secured directly to the flow actuator, wherein the coupling arm includes a first end shaped and dimensioned to receive a free end of the flow actuator and a second end with a threaded aperture shaped and dimensioned to receive a threaded rod connector to which the tap handle is selectively secured.

In some embodiments the coupling arm and the flow actuator both include a laterally oriented aperture, and a release pin is used to releasable connect the coupling arm to the flow actuator.

In some embodiments the decorative dispenser cover according to claim 15, further including an actuating lever attached to the coupling arm via an actuating lever connector.

In some embodiments the actuating lever connector includes a first end secured to a side of the coupling arm via a resilient clip connection and a second end receiving the actuating lever.

In some embodiments the second end of the actuating lever includes a hook shaped and dimensioned to engage an inwardly directed pin member of the rotating frame body member such that the rotating frame body member is caused to rotate with the movement of the actuating lever, and ultimately with the movement of the tap handle as it causes the coupling arm to rotate.

Other objects and advantages of the present invention will become apparent from the following detailed description when viewed in conjunction with the accompanying drawings, which set forth certain embodiments of the invention.

DETAILED DESCRIPTION

Figures 1, 2, 3A, 3B, 3C, 3D:
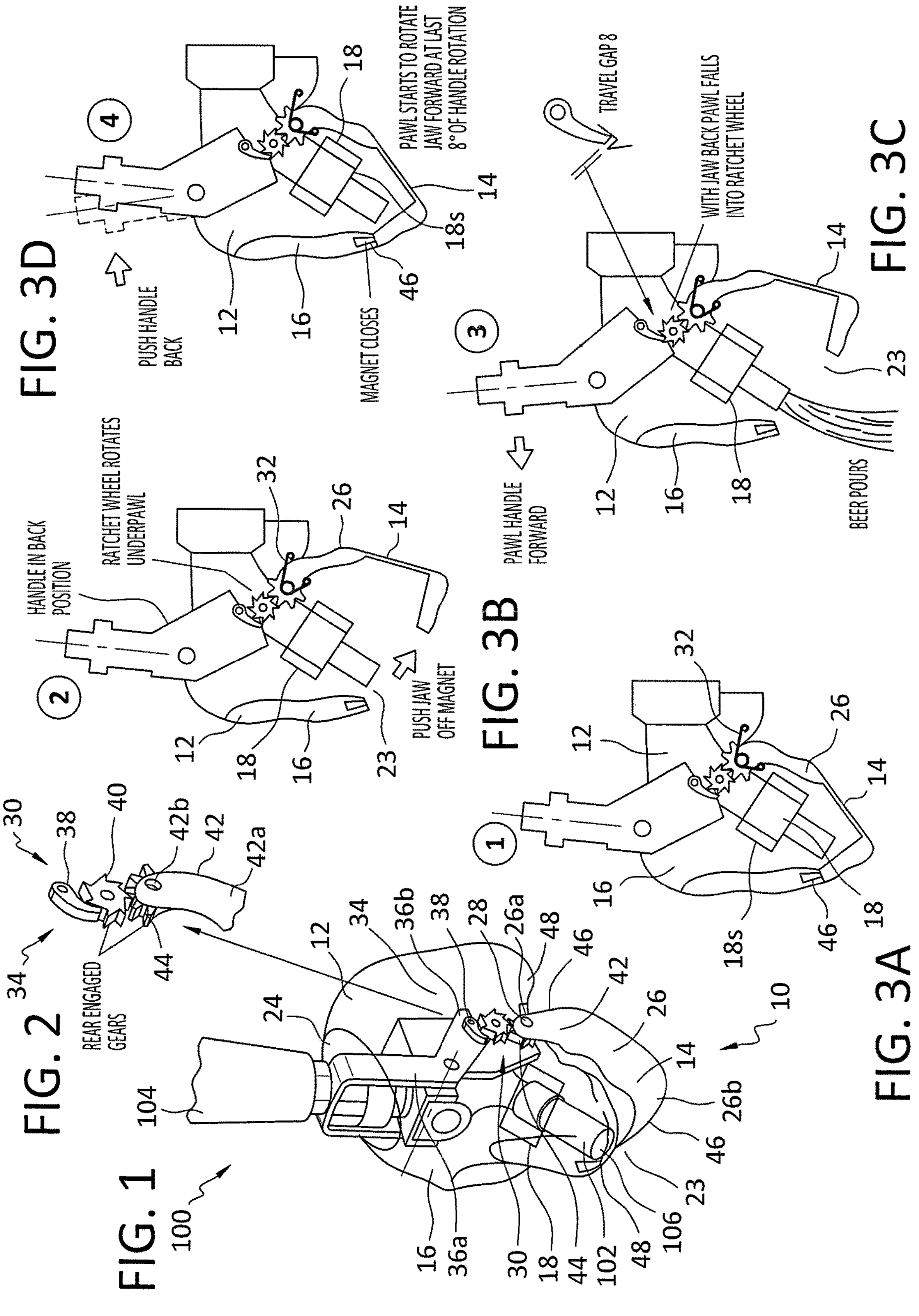
FIG. 1 is a perspective view of a decorative dispenser cover in accordance with a first embodiment.
FIG. 2 is a detailed view of the drive mechanism of the embodiment shown with reference to FIG. 1.
FIGS. 3A to 3D show the operation of the decorative dispenser cover of the first embodiment shown with reference to FIGS. 1 and 2.
Figure 4A:
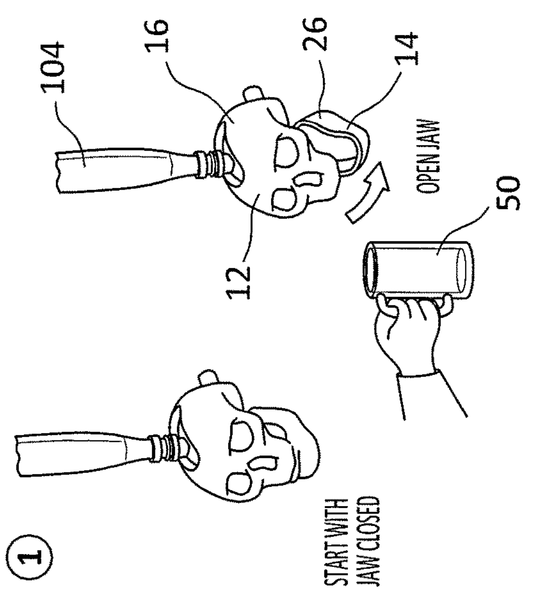
FIGS. 4A to 4F show the operational steps associated with the use of the decorative dispenser cover.
Figure 4B:
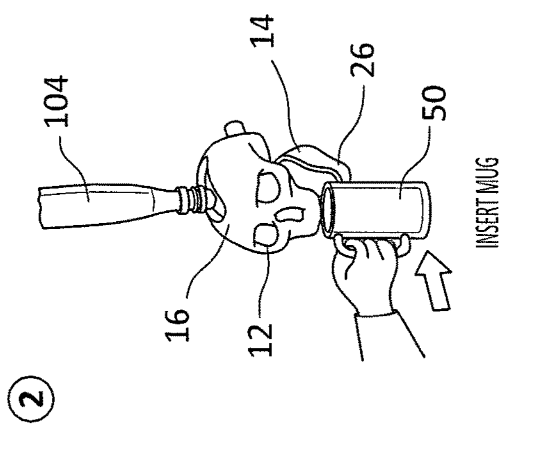
Figure 4C:
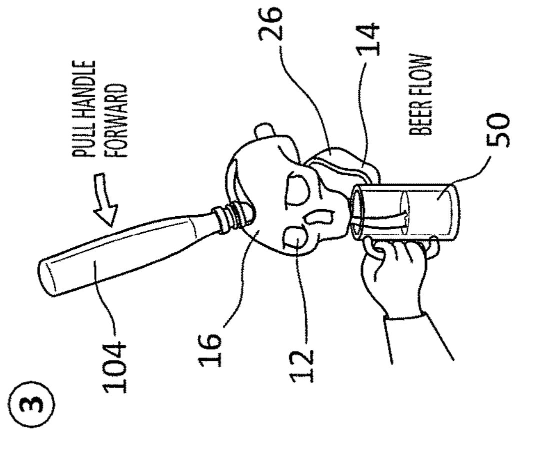
Figure 4D:
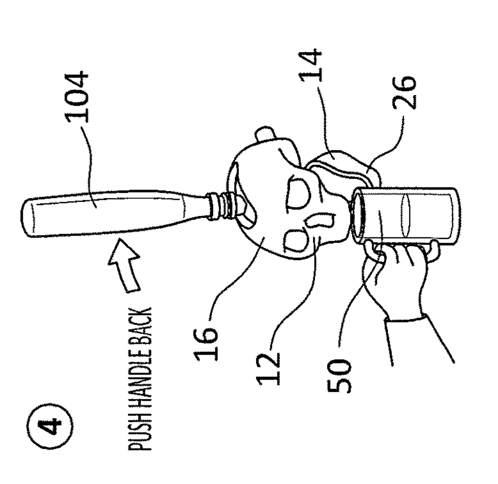
Figure 4E:
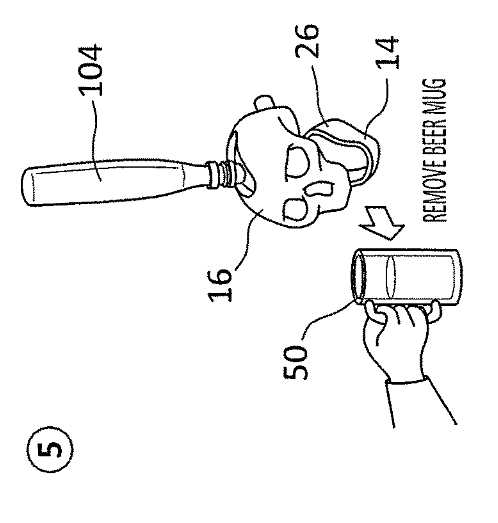
Figure 4F:
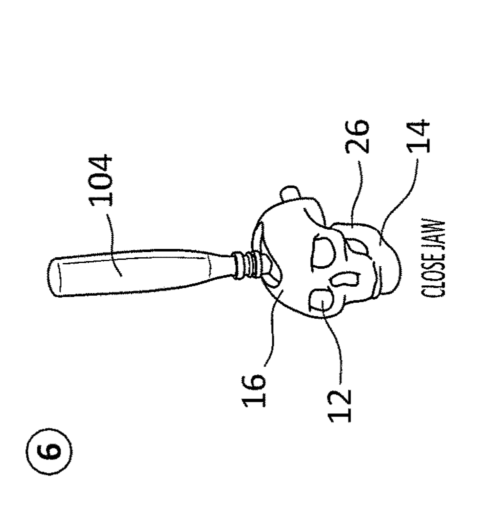
Figures 5A, 5B, 5C, 5D:
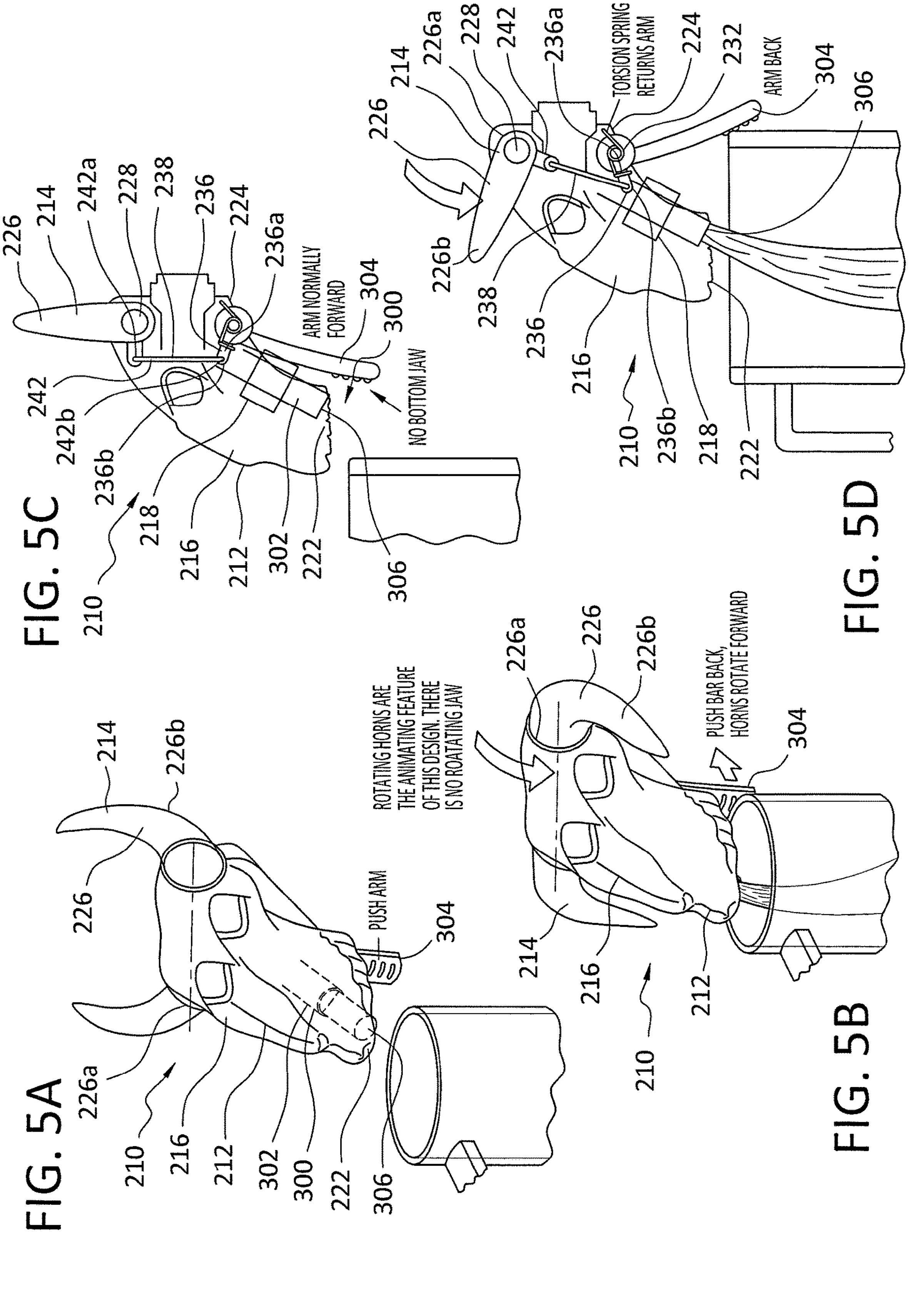
FIGS. 5A to 5D show a second embodiment of the decorative dispenser cover and the operational steps associated with the use thereof.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

Referring to FIGS. 1, 2, 3A to 3D, and 4A to 4F, a decorative dispenser cover 10 in accordance with an embodiment of the present invention is disclosed. The decorative dispenser cover 10 generally comprises a fixed frame member 12 and a rotating frame member 14. The decorative dispenser cover 10 provides an aesthetically desirable accessory for use in conjunction with a beverage dispenser, for example, a beer tap. While a skull is disclosed in accordance with a first embodiment, the fixed frame member 12 being in the form of a skull and the rotating frame member 14 being in the form of the lower jaw, the decorative dispenser cover 10 could take a variety of aesthetically desirable forms.

The decorative dispenser cover 10 is described herein for use in conjunction with a traditional beer tap 100, although it is appreciated the decorative dispenser cover could be used in conjunction with a variety of beverage dispensing systems. By way of example, and as those skilled in the art will certainly appreciate, a traditional beer tap 100 includes a faucet 102 and a flow actuator 104 (to which a beer tap handle 105 of a brewery is commonly secured). The flow actuator 104 is pivotally mounted relative to the faucet 102 and is coupled to a valve mechanism (not shown) leading to the faucet 102. During operation of the beer tap 100, the user pulls the tap handle 105 and the flow actuator 104 forward toward the user. Once the tap handle 105 and the flow actuator 104 are pulled fully forward, the valve (not shown) within the faucet 102 is opened, and beer is dispensed through the faucet 102 via its outlet 106.

The fixed frame member 12 includes a fixed frame body member 16 of an aesthetically pleasing appearance. The fixed frame body member 16 is shaped and dimensioned to fit about the dispensing faucet 102 of the beer tap 100 and the flow actuator 104 (including the tap handle 105) of the beverage dispenser faucet 102. As such, the fixed frame body member 16 includes a first opening 23 allowing for access to the outlet 106 of the beer tap 100 and a second opening 24 for access to the flow actuator 104 and tap handle 105 of the beer tap 100.

The fixed frame member 12 also includes coupling members 18 for selectively attaching the fixed frame body member 16, and ultimately the decorative dispenser cover 10 itself, to the beer tap 100 in a self-supported manner allowing use thereof as described below. In accordance with a first embodiment, the coupling members 18 include a plurality of retention members 18 formed along the rear surface 20 of the fixed frame body member 16. The retention members 18 are shaped and dimensioned for selective attachment to the beer tap 100 to properly position the first opening 23 relative to the outlet 106 of the beer tap 100 and the second opening 24 relative to flow actuator 104 and tap handle 105 of the beer tap 100. In accordance with the disclosed embodiment, the retention members 18 are integrally molded with the fixed frame body member 16 and include surfaces that are shaped to frictionally engage elements of the beer tap 100, for example, the faucet 102. The disclosed retention members 18 are shaped as recesses dimensioned for frictionally engaging the faucet 102 of the beer tap 100 so as to hold the decorative dispenser cover 10 in position relative to the beer tap 100. The retention members 18 include a concave surface 18*s* that fits about the faucet 102. The retention members 18 exhibit some resilience that enhances the engagement of the retention members 18 about the faucet 102. While a specific coupling mechanism is disclosed, it is appreciated that various coupling mechanisms, for example, clips that attach to the faucet body, snaps for attachment to the faucet body, thumb screws or latches, or other types of mechanical connection that achieve the goal of easy attachment and removal of the decorative dispenser cover 10 relative to the beer tap 100 could be used.

The decorative dispenser cover 10 also includes the rotating frame member 14. The rotating frame member 14 is pivotally coupled to the fixed frame body member 16 such that the rotating frame member 14 moves in conjunction with movement of the flow actuator 104 and the tap handle 105.

The rotating frame member 14 includes a rotating frame body member 26 of an aesthetically pleasing appearance. The rotating frame body member 26 is shaped and dimensioned to fit adjacent to the fixed frame body member 16 and rotate relative thereto. As such, the rotating frame body member 26 includes a first end 26*a* pivotally coupled to the fixed frame body member 16 and free second end 26*b* that moves relative to the remainder of the fixed frame body member 16. For example, and as shown with reference to the embodiment disclosed in FIGS. 1, 2, 3A to 3D, and 4A to 4F, the rotating frame body member 26 is formed in the shape of a lower jaw and is positioned adjacent the second opening 24 of the fixed frame body member 16, that is, the portion of the skull embodied by the fixed frame body member 16 that replicates the upper jaw of the skull, such that the rotating frame body member 26 may move to reveal the outlet 106 of the faucet 102. As will be appreciated based upon the following disclosure, the rotating frame body member 26 rotates relative to the fixed frame body member 16 between a closed first position where the free second end 26*b* of the rotating frame body member 26 is positioned adjacent to the fixed frame body member 16 in a manner substantially covering the first opening 23 and an open second position where the free second end 26*b* of the rotating frame body member 26 is moved away from the fixed frame body member 16 to expose the first opening 23.

As briefly mentioned, the first end 26*a* of the rotating frame body member 26 is pivotally coupled, for example, by a hinge member 28, to the fixed frame body member 16. Controlled movement of the rotating frame body member 26 is facilitated by a spring and gear mechanism 30 that links the rotating frame body member 26 to the movement of the flow actuator 104 and tap handle 105. While a specific mechanism is disclosed below for controlling the movement of the fixed frame body member 16 relative to the rotating frame body member 26, it is appreciated a variety of mechanical, hydraulic, pneumatic, electrical, magnetic, etc. mechanism may be employed for controlling the movement of the fixed frame body member 16 relative to the rotating frame body member 26.

Regardless of the mechanism controlling the movement of the fixed frame body member 16 relative to the rotating frame body member 26, and with reference to FIGS. 4A to 4F, the process of positioning a filling container, for example, a glass 50, begins with the rotating frame body member 26 in its closed orientation relative to the fixed frame body member 16. The rotating frame body member 26 is then moved to its opened orientation relative to the fixed frame body member 16 and the glass 50 is moved adjacent to the outlet 106 of the faucet 102. The flow actuator 104 and tap handle 105 are then moved forward allowing material, for example, beer, to flow from the outlet 106. Once the container is filled, the flow actuator 104 and tap handle 105 are moved rearwardly and the jaw closes.

Referring to FIGS. 1, 2, and 3A to 3D, the spring and gear mechanism 30 of the disclosed embodiment includes a torsion spring 32 extending between the fixed frame body member 16 and the rotating frame body member 26 to bias the rotating frame body member 26 to the first closed position. While a specific actuation assembly is disclosed herein, it is appreciated that other actuation mechanisms may be used.

The spring and gear mechanism 30 further includes a gearing system 34 that controls movement of the rotating frame body member 26. In particular, the gearing system 34 includes a drive lever 36 having a first end 36*a* selectively coupled to the flow actuator 104 (and the tap handle 105) and a second end 36*b* with a ratcheting pawl 38 pivotally secured thereto for selectively controlling engagement and disengagement of the ratcheting pawl 38 and drive lever 36 with a driving gear 40. The driving gear 40 is also connected to a rotating lever 42 of the rotating frame member 14. The rotating lever 42 includes a first end 42*a* secured to the rotating frame body member 26 and a second end 42*b* provided with gears 44 for engagement with the driving gear 40.

The second end 36*b* of the drive lever 36 moves between a first position when the flow actuator 104 and the tap handle 105 are back (that is, and with reference to FIG. 3A, the flow actuator 104 and the tap handle 105 are positioned to the right (clockwise a distance sufficient to ensure the valve of the faucet 102 remains closed and the valve of the faucet 102 is closed and a second position when the flow actuator 104 and the tap handle are pulled forward (that is, and with reference to FIG. 3C, the flow actuator 104 and the tap handle 105 are moved to the left (counterclockwise) a distance sufficient to ensure the valve of the faucet 102 is opened. In the first position, the ratcheting pawl 38 sits disengaged from the driving gear 40 such that the rotating frame body member 26 may be pushed away from the fixed frame body member 16 against the bias of the torsion spring 32. As the rotating frame body member 26 is rotated, the rotating lever 42 acts upon the driving gear 40 to cause it to rotate in a first direction. Because of the respective shapes of the ratcheting pawl 38 and the gearing of the driving gear 40, the driving gear 40 is free to rotate in the first direction. The flow actuator 104 and the tap handle 105 are then pulled forward opening the valve of the faucet 102. Pulling the flow actuator 104 and the tap handle 105 forward also causes the second end 36*b* of the drive lever 36 to move to its second position where it pushes the ratcheting pawl 38 forward such that it seats within the gearing of the driving gear 40 and blocks the ratcheting pawl 38 preventing movement of the driving gear 40 in a second direction relative to ratcheting pawl 38. The rotating frame body member 26 is then held in position while beer flows from the outlet 106 of the faucet 102. When the flow actuator 104 and the tap handle 105 are moved back to the first position, the ratcheting pawl 38 is moved to disengage from the driving gear 40 and allow the bias of the torsion spring 32 to move the rotating frame body member 26 back to its first closed position.

Controlled movement of the rotating frame member 14 is further facilitated by the provision of magnets 46 and steel (or other magnetic metal) contacts 48 positioned at specific locations along the respective rotating frame body member 26 and the fixed frame body member 16 such that the magnets 46 and steel contacts 48 are brought adjacent each other such that the magnetic attraction therebetween causes the rotating frame body member 26 to be held in either an open or closed position.

While magnets are disclosed above for use in conjunction with the mechanical linkages, it is contemplated that magnets could be used as a primary mechanism in controlling the movement of the rotating frame body member relative to the fixed frame body member.

Regardless of the specifics of the mechanism for causing movement, it is appreciated the actuation mechanism should be designed to accommodate a universal connection between the flow actuator and the mechanical linkage to operate with the same range and timing of motion for any decorative elements that selectively cover and uncover the faucet.

As mentioned above, the decorative dispenser cover 10 may be used with beverage dispensers other than beer taps. For example, and as disclosed with reference to FIGS. 5A to 5D, the decorative dispenser cover 210 could be used in conjunction with a typical beverage soda dispenser 300 commonly found at restaurants and convenience stores.

In accordance with such usage, the decorative dispenser cover 210 generally comprises a fixed frame member 212 and a rotating frame member 214. As with the prior embodiment, the decorative dispenser cover 210 provides an aesthetically desirable accessory for use in conjunction with a beverage dispenser 300. While a bull head with moving horns is disclosed in accordance with an embodiment, the fixed frame member 212 being in the form of a bull head and the rotating frame member 214 being in the form of moving horns, the decorative dispenser cover 210 could take a variety of aesthetically desirable forms.

The decorative dispenser cover 210 is described herein for use in conjunction with a traditional beverage dispenser 300 found in many restaurants and convenience stores, it is appreciated the decorative dispenser cover could be used in conjunction with a variety of beverage dispensing system. By way of example, and as those skilled in the art will certainly appreciate, a traditional beverage dispenser 300 includes a faucet 302 and an actuating lever 304. The actuating lever 304 is pivotally mounted relative to the faucet 302 and is coupled to a valve mechanism (not shown) leading to the faucet 302. During operation of the beverage dispenser 300, the user pushes the actuating lever 304 towards the beverage dispenser (that is, and with reference to FIG. 5D, to the right in a clockwise direction). Once the actuating lever 304 is pushed forward and towards the beverage dispenser, the valve is opened, and beverage is dispensed through the faucet 302 via its outlet 306.

The fixed frame member 212 includes a fixed frame body member 216 of an aesthetically pleasing appearance. The fixed frame body member 216 is shaped and dimensioned to fit about the dispensing faucet 302 of the beverage dispenser 300 and the actuating lever 304 of the beverage dispenser faucet 302. As such, the fixed frame body member 216 includes a first opening 222 allowing for access to the outlet 306 of the beverage dispenser 300 and a second opening 224 for access to the actuating lever 304 of the beverage dispenser 300, wherein the first and second openings 222, 224 may be contiguous.

The fixed frame member 212 also includes coupling members for selectively attaching the fixed frame body member 216, and ultimately the decorative dispenser cover 210 itself, to the beverage dispenser 300 in a self-supported manner allowing use thereof as described below. In accordance with a disclosed embodiment, the coupling members include a plurality of clips 218 extending from a rear surface 220 of the fixed frame body member 216. The clips 218 are shaped and dimensioned for selective attachment to the beverage dispenser 300 in a manner properly positioning the first opening 222 relative to the outlet 306 of the beverage dispenser 300 and the second opening 224 relative to actuating lever 304 of the beverage dispenser 300.

The decorative dispenser cover 210 also includes a rotating frame member 214. The rotating frame member 214 is pivotally coupled to the fixed frame body member 216 such that the rotating frame member 214 moves in conjunction with movement of the actuating lever 304.

The rotating frame member 214 includes a rotating frame body member 226 of an aesthetically pleasing appearance. The rotating frame body member 226 is shaped and dimensioned to fit adjacent the fixed frame body member 216 and rotate relative thereto. As such, the rotating frame body member 226 includes a first end 226*a* pivotally coupled to the fixed frame body member 216 and free second end 226*b* that moves relative to the remainder of the fixed frame body member 216. For example, and as shown with reference to the embodiment disclosed in FIGS. 5A-D, the rotating frame body member 226 is formed in the shape of horns and is positioned adjacent the head of the fixed frame body member 216, such that the rotating frame body member 226 moves upon actuation of the beverage dispenser 300. As will be appreciated based upon the following disclosure, the rotating frame body member 226 rotates relative to the fixed frame body member 216 between a first position where the free second end 226*b* of the rotating frame body member 226 is in a first position relative to the fixed frame body member 216 and a second position where the free second end 226*b* of the rotating frame body member 226 is rotated to a second position relative to the fixed frame body member 216 to expose the second opening 224.

As briefly mentioned, the first end 226*a* of the rotating frame body member 226 is pivotally coupled, for example, by hinge member 228, to the fixed frame body member 216. Controlled movement of the rotating frame body member 226 is facilitated by a spring and gear mechanism 230 that links the rotating frame body member 226 to the movement of the actuating lever 304. The spring and gear mechanism 230 includes a torsion spring 232 extending between the fixed frame body member 216 and the rotating frame body member 226 to bias the rotating frame body member 226 to the first closed position.

The spring and gear mechanism 230 further includes a gearing system 234 that controls movement of the rotating frame body member 226. In particular, the gearing system 234 includes a drive lever 236 having a first end 236*a* selectively coupled to the actuating lever 304 and a second end 236*b* with a linkage arm 238 pivotally secured thereto for selectively controlling rotating frame body member 226. The driving gear 240 is also connected to a rotating lever 242 of the rotating frame member 214. The rotating lever 242 includes a first end 242*a* secured to the rotating frame body member 226 and a second end 242*b* secured to the linkage arm 238.

The second end 236*b* of the drive lever 236 moves between a first position when the actuating lever 304 is back and the valve (not shown) of the faucet 302 is closed and a second position when the actuating lever 304 is pulled forward and the valve (not shown) of the faucet 302 is opened.

Figure 6A:
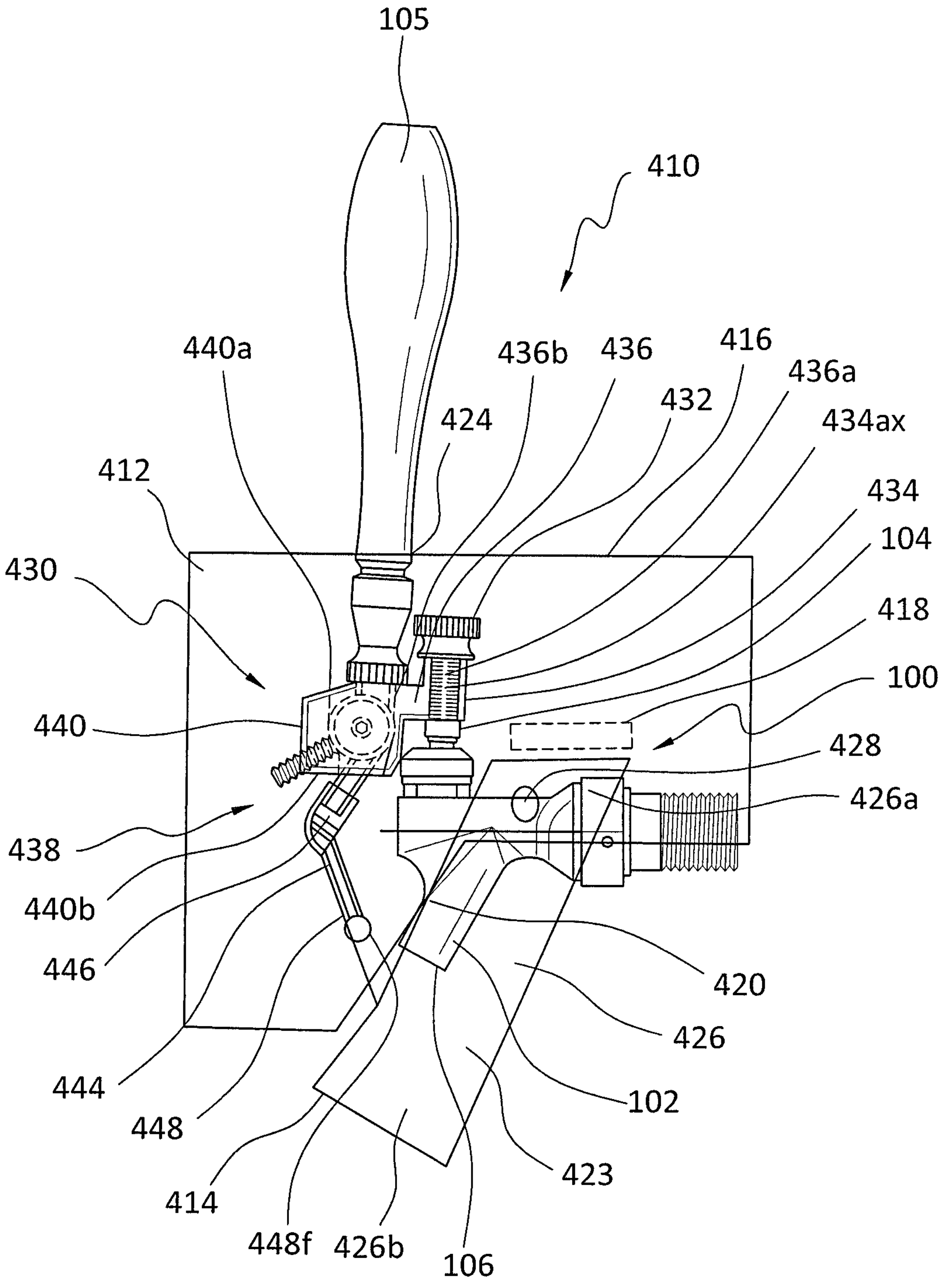
FIGS. 6A to 6C show a third embodiment of the decorative dispenser cover and the operational steps associated with the use thereof.
Figure 6B:
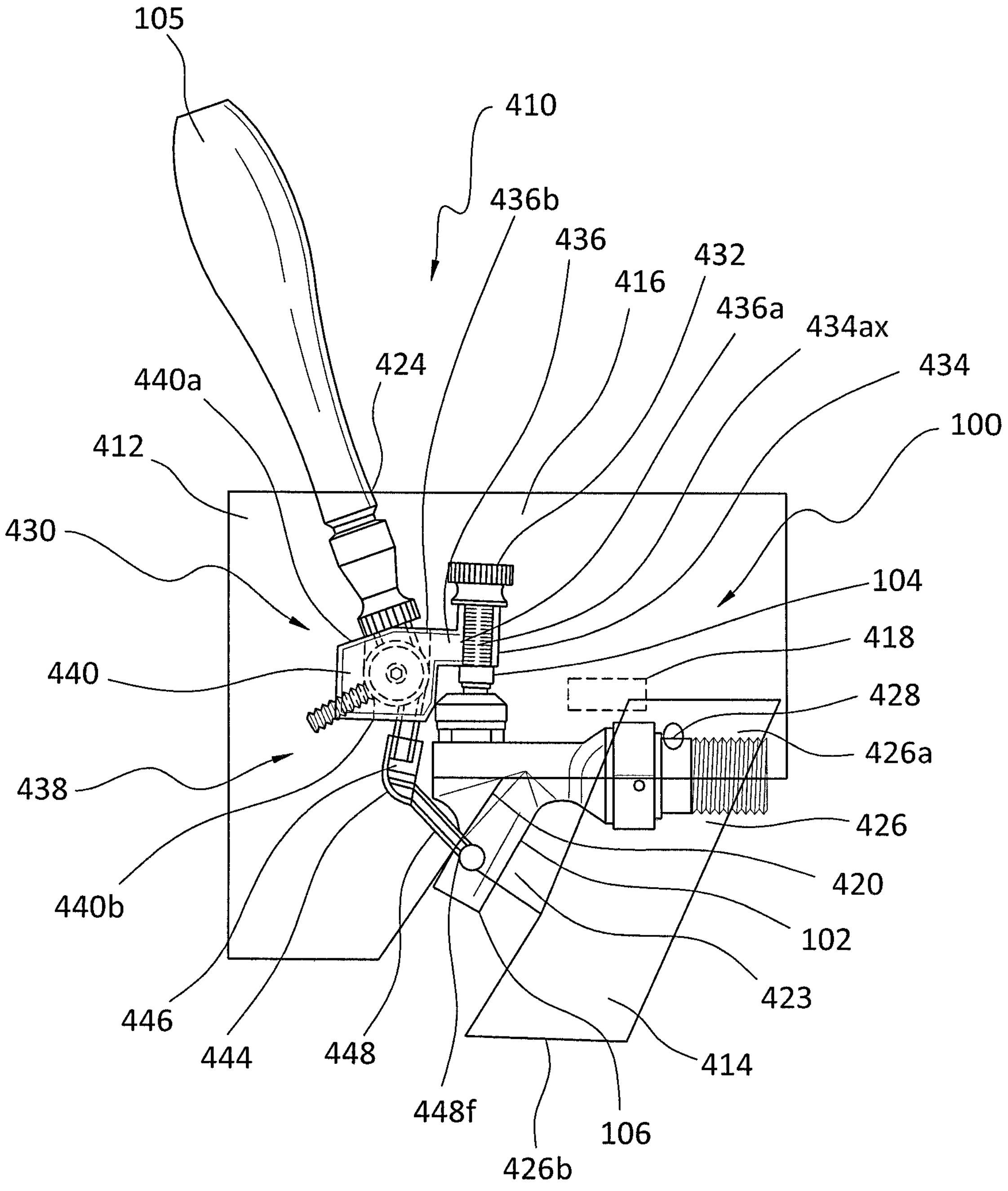
Figure 6C:
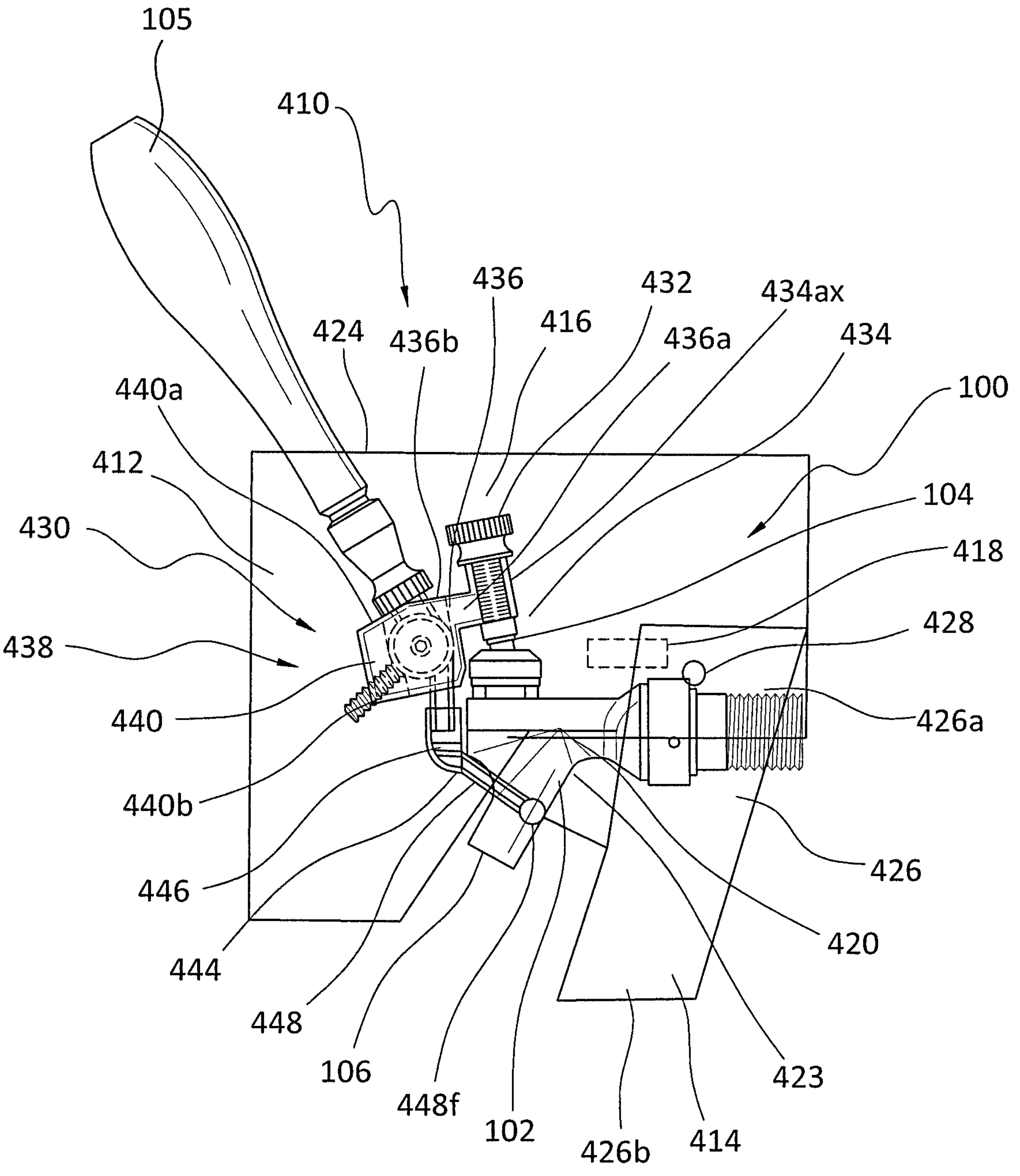
Figure 7:
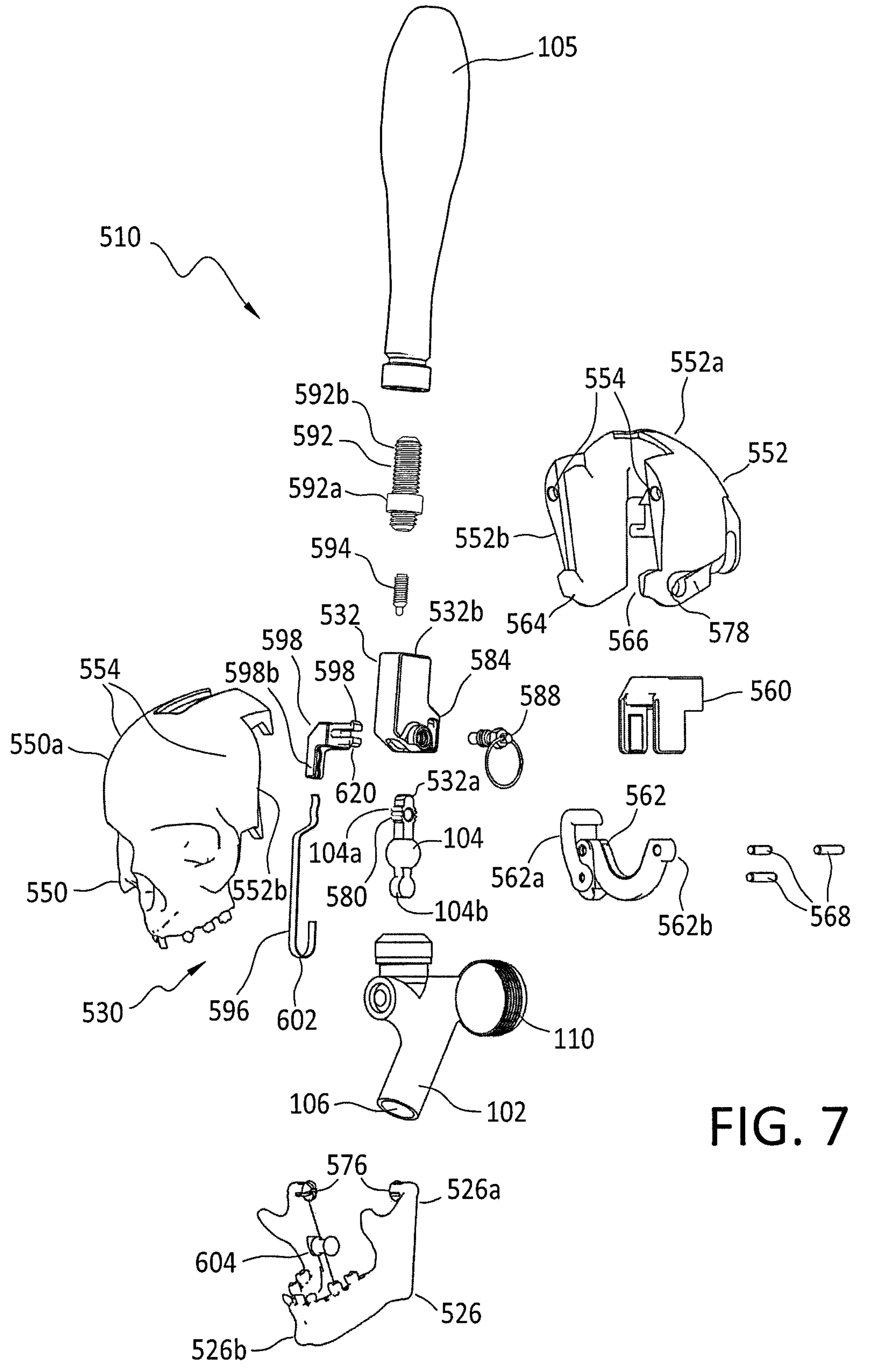
FIG. 7 is an exploded view of a fourth embodiment of the decorative dispenser cover.
Figure 8:
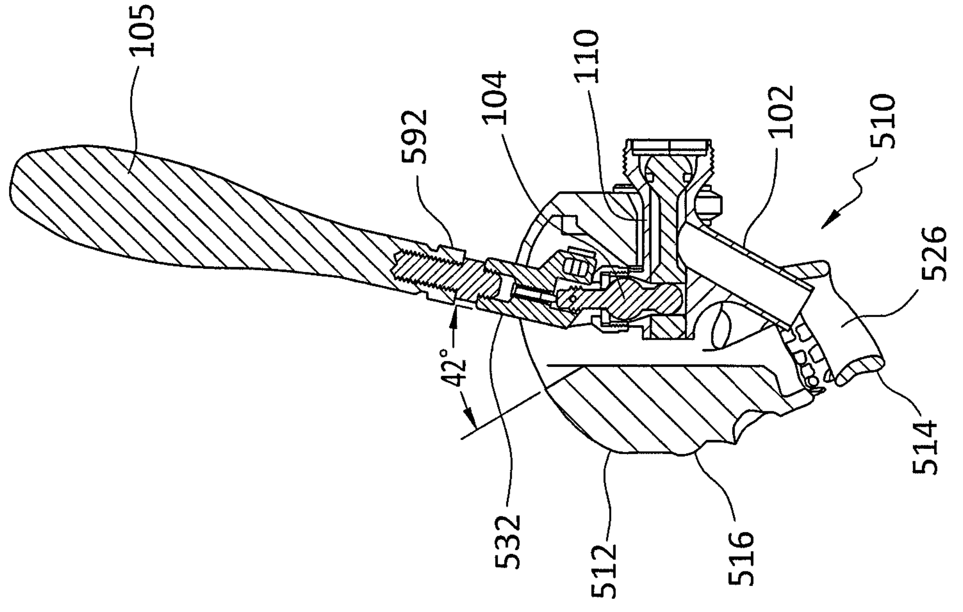
FIG. 8 is a rendering showing a cross sectional view of the fourth embodiment of the decorative dispenser cover with the rotating frame member in a closed orientation taken along the line A-A in FIG. 9.
Figure 9:
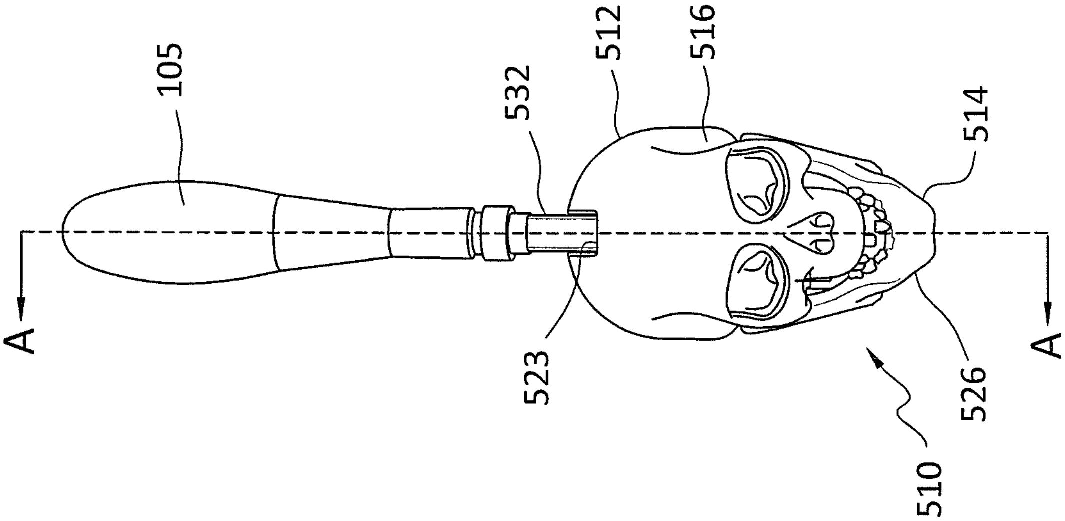
FIG. 9 is a rendering showing a front elevation view of the fourth embodiment of the decorative dispenser cover with the rotating frame member in a closed orientation.
Figure 10:
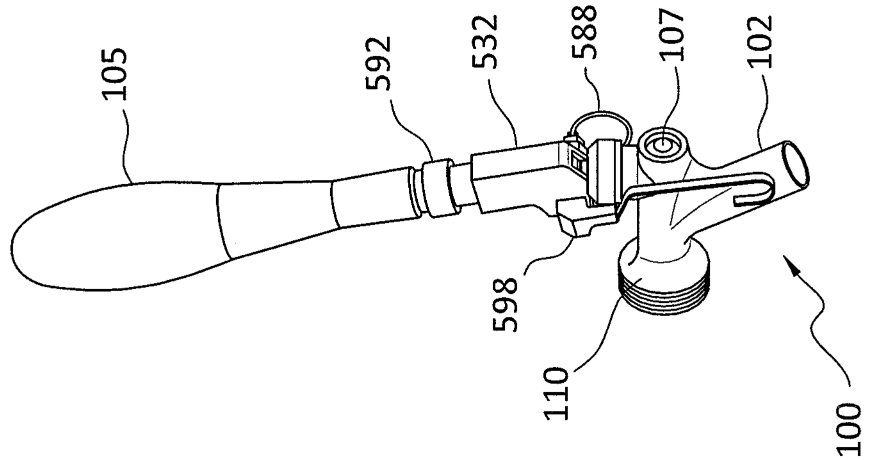
FIG. 10 is a rendering of a beer tap integrating elements of the fourth embodiment of the decorative dispenser cover.
Figure 12:
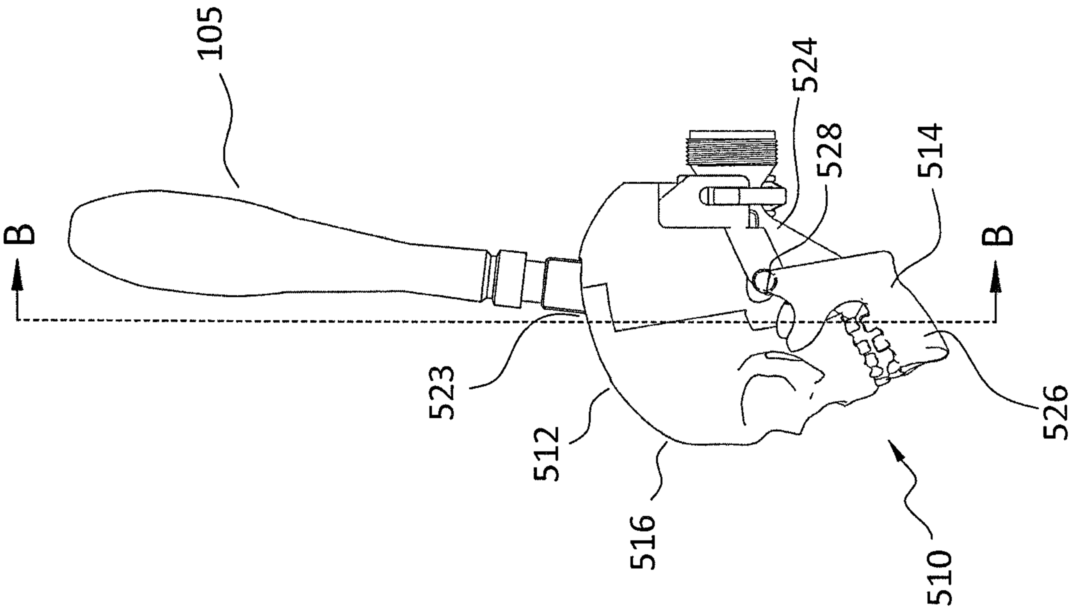
FIG. 12 is a side elevation view of the fourth embodiment of the decorative dispenser cover with the rotating frame member in a closed orientation.
Figure 11:
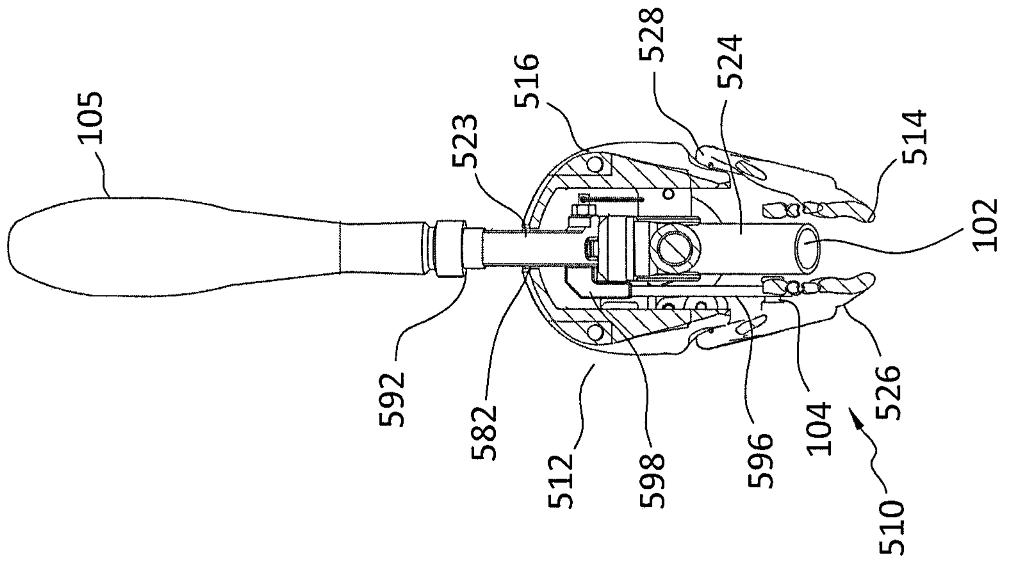
FIG. 11 is a cross sectional view of the fourth embodiment of the decorative dispenser cover with the rotating frame member in a closed orientation taken along the line B-B in FIG. 12.
Figure 15:
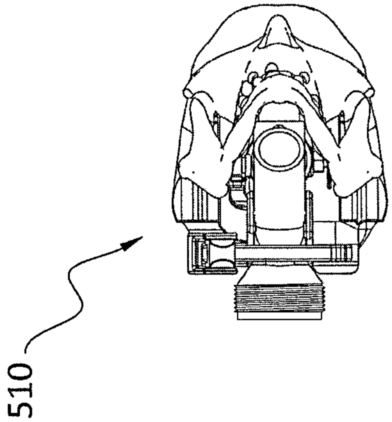
FIG. 15 is a bottom view of the fourth embodiment of the decorative dispenser cover with the rotating frame member in a closed orientation.
Figure 14:
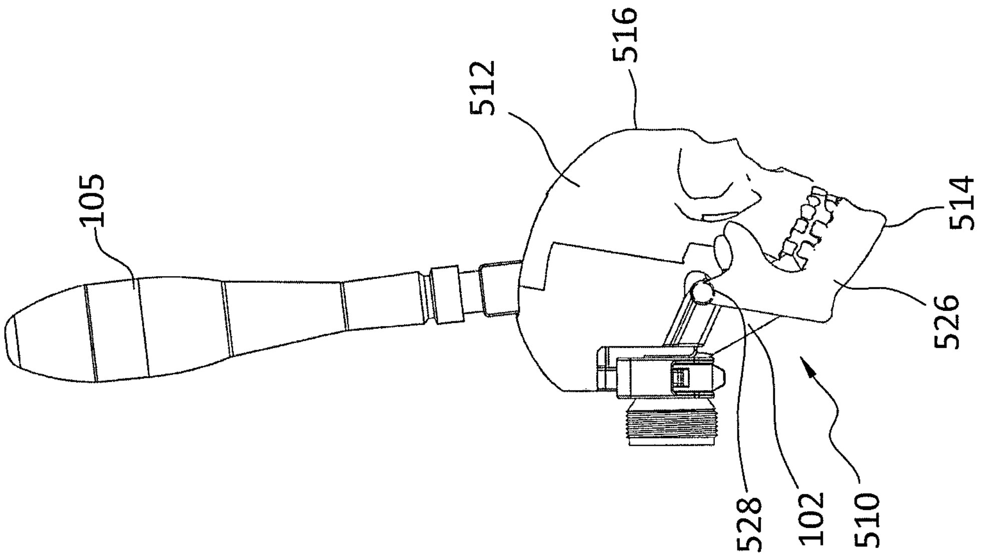
FIG. 14 is a side elevation view (opposite that shown in FIG. 12) of the fourth embodiment of the decorative dispenser cover with the rotating frame member in a closed orientation.
Figure 13:
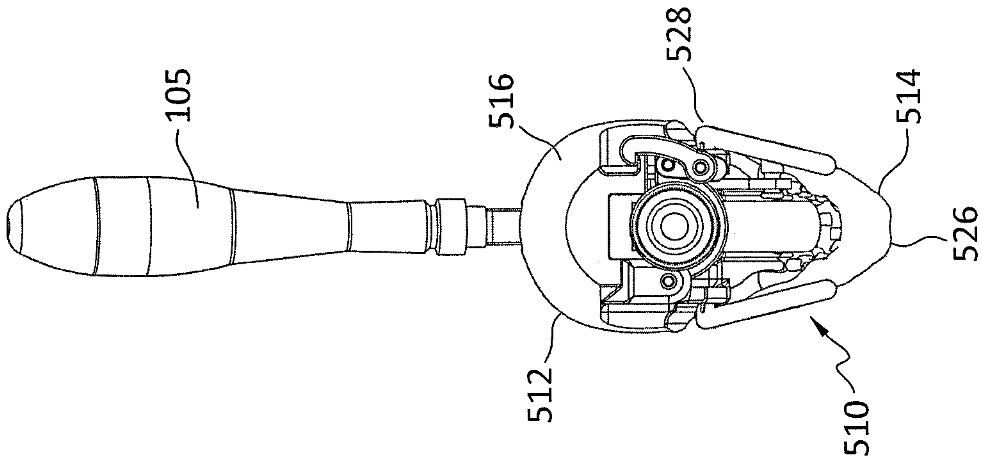
FIG. 13 is a rear elevation view of the fourth embodiment of the decorative dispenser cover with the rotating frame member in a closed orientation.
Figure 18:
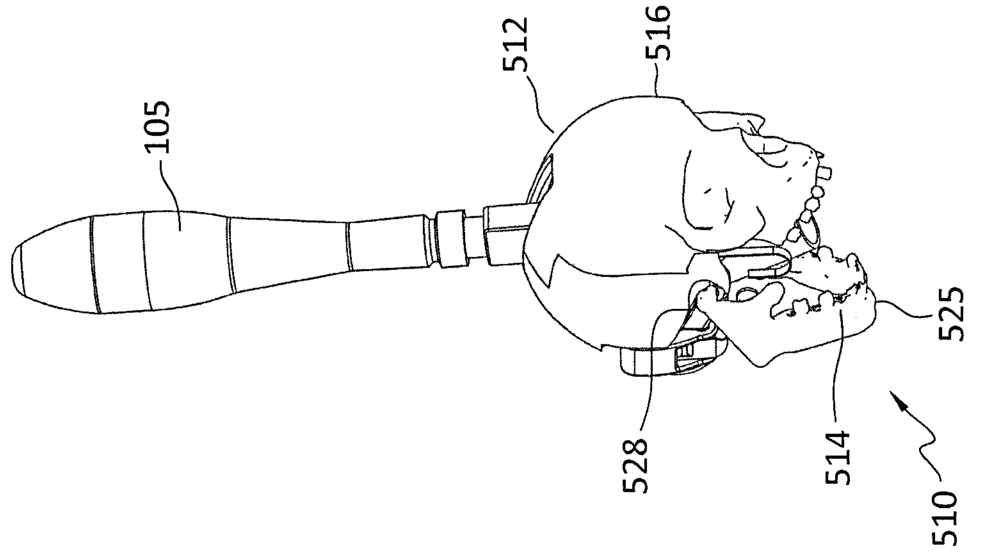
FIG. 18 is a front perspective view of the fourth embodiment of the decorative dispenser cover with the rotating frame member in an open orientation.
Figure 17:
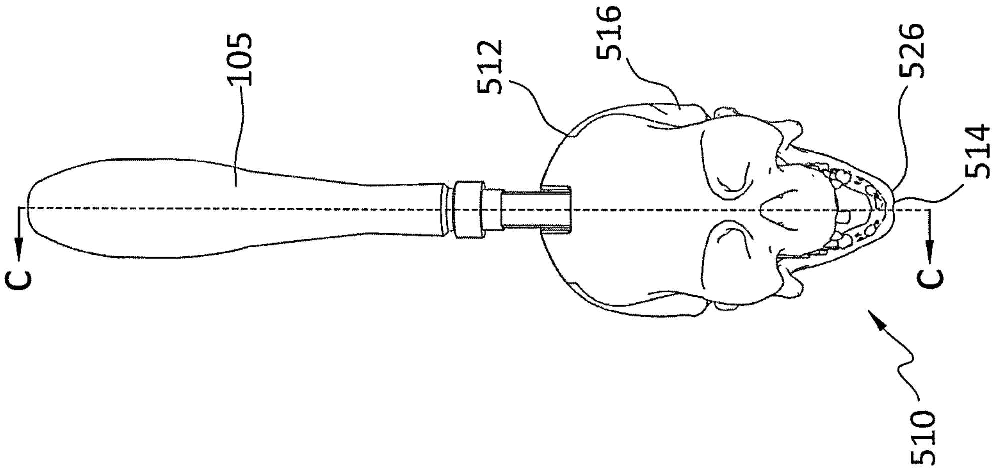
FIG. 17 is a front elevation view of the fourth embodiment of the decorative dispenser cover with the rotating frame member in an open orientation.
Figure 16:
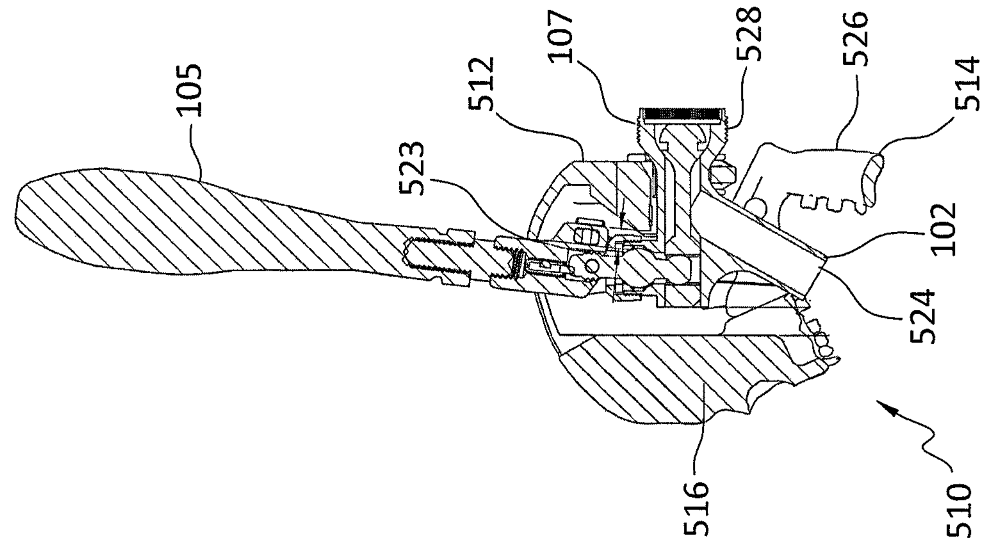
FIG. 16 is a cross sectional view of the fourth embodiment of the decorative dispenser cover with the rotating frame member in an open orientation taken along the line C-C in FIG. 17.
Figure 19:
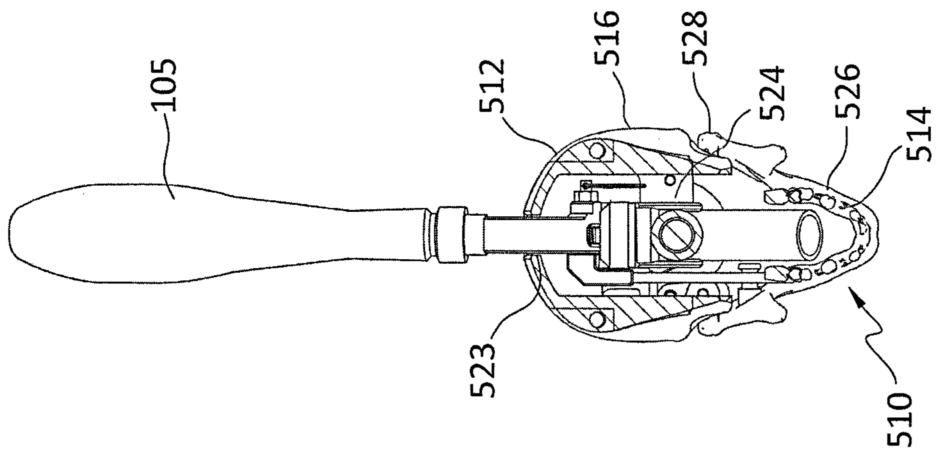
FIG. 19 is a cross sectional view of the fourth embodiment of the decorative dispenser cover with the rotating frame member in an open orientation taken along the line D-D in FIG. 20.
Figure 20:
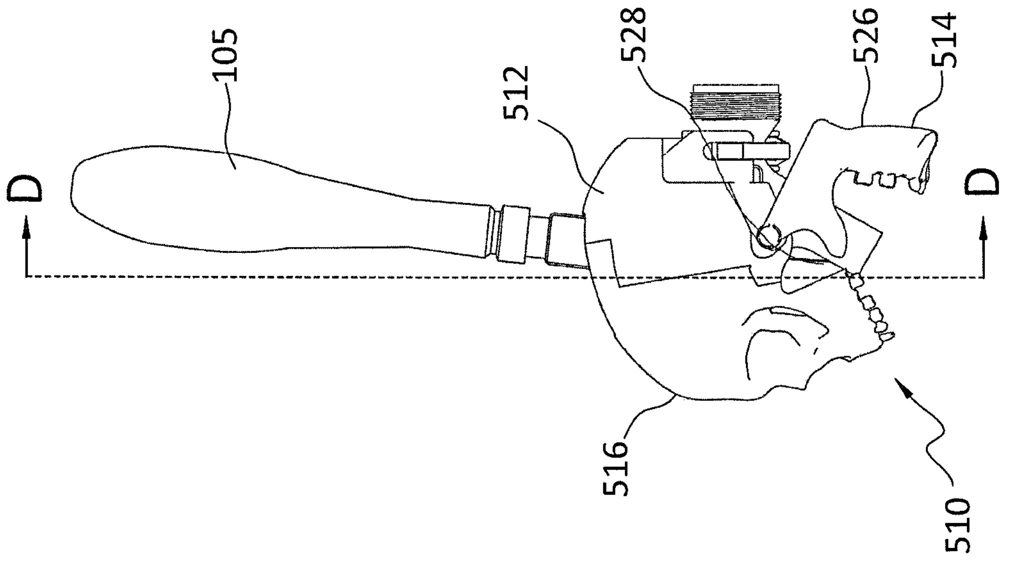
FIG. 20 is a side elevation view of the fourth embodiment of the decorative dispenser cover with the rotating frame member in an open orientation.
Figure 21:
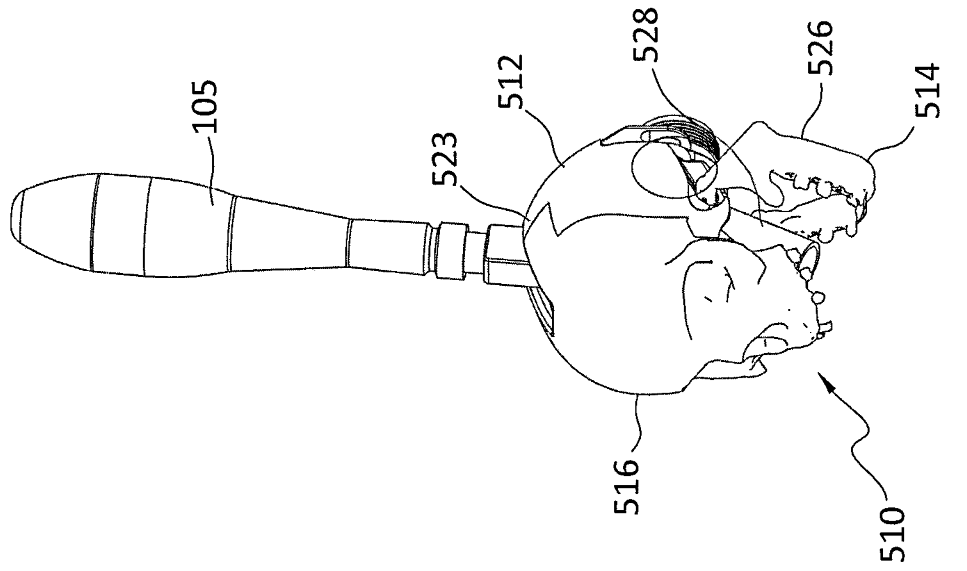
FIG. 21 is a front perspective view (different than that shown in FIG. 18) of the fourth embodiment of the decorative dispenser cover with the rotating frame member in an open orientation.
Figure 24:
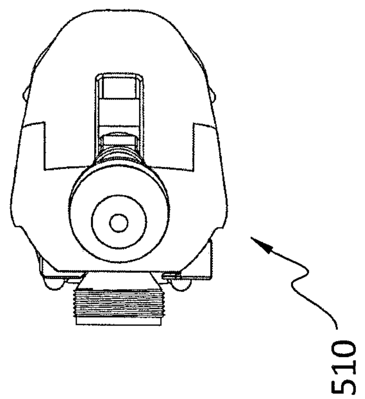
FIG. 24 is a top view of the fourth embodiment of the decorative dispenser cover with the rotating frame member in an open orientation.
Figure 23:
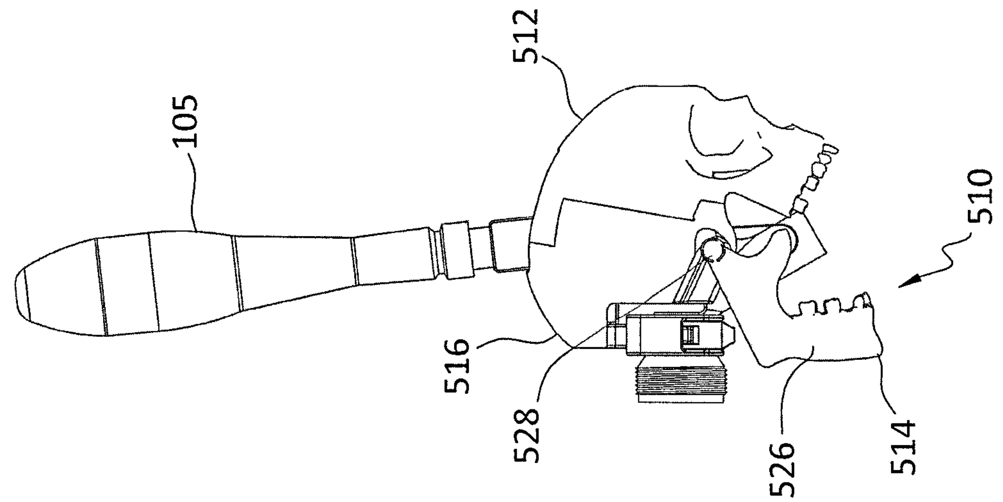
FIG. 23 is a side elevation view (opposite that shown in FIG. 20) of the fourth embodiment of the decorative dispenser cover with the rotating frame member in an open orientation.
Figure 22:
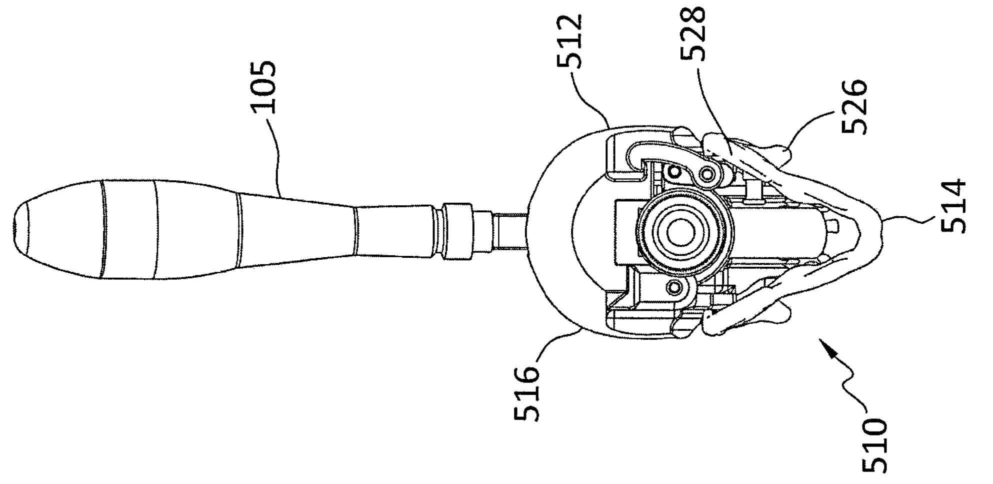
FIG. 22 is a rear view of the fourth embodiment of the decorative dispenser cover with the rotating frame member in an open orientation.

In accordance with yet another embodiment as shown with reference to FIGS. 6A to 6C an alternate linkage mechanism is disclosed. As with the prior embodiments, the decorative dispenser cover 410 generally comprises a fixed frame member 412 and a rotating frame member 414. While the decorative dispenser cover 410 is described herein for use in conjunction with a traditional beer tap 100, it is appreciated the decorative dispenser cover could be used in conjunction with a variety of beverage dispensing systems. As explained above, a traditional beer tap 100 includes a faucet 102 and a flow actuator 104. The flow actuator 104 is pivotally mounted relative to the faucet 102 and is coupled to a valve mechanism (not shown) leading to the faucet 102. In accordance with the disclosed embodiment, the tap handle 105 is not directly secured to the flow actuator 104, but is part of the linkage mechanism 430 and is secured to the flow actuator 104 via a linkage mechanism disclosed below in detail. During operation of the beer tap 100, the user pulls the tap handle 105 causing the flow actuator 104 to move toward the user. Once the flow actuator 104 is pulled fully forward, the valve is opened, and beer is dispensed through the faucet 102 via its outlet 106.

The fixed frame member 412 includes a fixed frame body member 416 of an aesthetically pleasing appearance. The fixed frame body member 416 is shaped and dimensioned to fit about the dispensing faucet 102 of the beer tap 100 and the flow actuator of the beverage dispenser faucet 102. As such, the fixed frame body member 416 includes a first opening 423 allowing for access to the outlet 106 of the beer tap 100 and a second opening 424 for access to the flow actuator of the beer tap 100.

The fixed frame member 412 also includes coupling members for selectively attaching the fixed frame body member 416, and ultimately the decorative dispenser cover 410 itself, to the beer tap 100 in a self-supported manner allowing use thereof as described below. The coupling members include a plurality of retention members 418 formed along the rear surface 420 of the fixed frame body member 416. The retention members 418 are shaped and dimensioned for selective attachment to the beer tap 100 in a manner properly positioning the first opening 423 relative to the outlet of the beer tap 100 and the second opening 424 relative to flow actuator of the beer tap 100. The retention members 418 are integrally molded with the fixed frame body member 416 and include surfaces that are shaped to frictionally engage elements of the beer tap, for example, the faucet 102. The disclosed retention members 418 are recesses shaped and dimensioned to frictionally engage the faucet 102 of the beer tap 100 so as to hold the decorative dispenser cover 410 in position relative to the beer tap 100. The retention members 418 include a concave surface that fits about the faucet 102. The retention members 418 exhibit some resilience that enhances the engagement of the retention members 418 about the faucet 102.

The decorative dispenser cover 410 also includes the rotating frame member 414. The rotating frame member 414 is pivotally coupled to the fixed frame body member 416 such that the rotating frame member 414 moves in conjunction with movement of the flow actuator 104.

The rotating frame member 414 includes a rotating frame body member 426 of an aesthetically pleasing appearance. The rotating frame body member 426 is shaped and dimensioned to fit adjacent to the fixed frame body member 416 and rotate relative thereto. As such, the rotating frame body member 426 includes a first end 426*a* pivotally coupled to the fixed frame body member 416 and free second end 426*b* that moves relative to the remainder of the fixed frame body member 416. For example, and as shown with reference to the embodiment disclosed in FIGS. 6A to 6C, the rotating frame body member 426 is formed in the shape of a lower jaw and is positioned adjacent the second opening 424 of the fixed frame body member 416, that is, the portion of the skull embodied by the fixed frame body member 416 that replicating the lower jaw of the skull, such that the rotating frame body member 426 may move to reveal the outlet 106 of the faucet 102. The rotating frame body member 426 rotates relative to the fixed frame body member 416 between a closed first position where the free second end 426*b* of the rotating frame body member 426 is positioned adjacent to the fixed frame body member 416 in a manner substantially covering the first opening 423 and an open second position where the free second end 426*b* of the rotating frame body member 426 is moved away from the fixed frame body member 416 to expose the first opening 423.

As briefly mentioned, the first end 426*a* of the rotating frame body member 426 is pivotally coupled, for example, via a hinge member 428, to the fixed frame body member 416. Controlled movement of the rotating frame body member 426 is facilitated by a linkage mechanism 430 that links the rotating frame body member 426 to the movement of the flow actuator 104.

Referring to FIG. 6A to 6C, the linkage mechanism 430 of the disclosed embodiment includes a coupling arm 432 secured directly to the flow actuator 104. The coupling arm 432 includes an attachment sleeve 434 that is screwed onto the flow actuator 104. The attachment sleeve 434 includes a longitudinal axis 434*ax* that aligns with the longitudinal axis of the flow actuator 104. The coupling arm 432 also includes a lateral sleeve 436 that extends perpendicularly from the longitudinal axis 434*ax* of the attachment sleeve 434. The lateral sleeve 436 includes a first end 436*a* that is secured to the attachment sleeve 434 and a second end 436*b* opposite the first end 436*a*. A lever assembly 438 is pivotally secured to the second end 436*b* of the lateral sleeve 436 at a position opposite the attachment sleeve 434. The lever assembly 438 includes a pivot member 440 that is pivotally secured to the lateral sleeve 436 at the second end 436*b* thereof. A tap handle 105 is secured to a first side 440*a* of the pivot member 440 and a lever arm 444 is secured to a second side 440*b* of the pivot member 440.

The lever arm 444 is bent to form a first segment 446 that is directly attached to the second side 440*b* of the pivot member 440 and a second segment 448 that is obliquely oriented relative to the first segment 446. The first and second segments 446, 448 are oriented at approximately an angle of 40 to 50 degrees. The free end 448*f* of the second segment 448 is secured to the rotating frame body member 426 such that the rotating frame body member 426 is caused to rotate with the movement of the lever arm 444. While a specific lever arm and pivot point are disclosed herein, it is appreciated that the pivot point of the tap handle may be combined inline or attached to the actuator so the number of parts are reduced and the tap handle will be in line with, rather than forward of the handle positions of, all the other taps on the wall.

In use, as the tap handle 105 is drawn forward, the lever arm 444 is caused to rotate while the flow actuator 104 remains stationary. The lever arm 444 rotates in manner cause the rotating frame body member 426 to move to an opened position. The first segment 446 is oriented to eventually come into contact with the forward end of the faucet 102. When the first segment 446 come into contact with the forward end of the faucet 102, the lever arm 444 is prevented from further rotating and the further pulling force applied to the tap handle 105 causes the flow actuator 104 to be pulled forward causing the flow of beverage from the faucet 102.

In accordance with yet another embodiment as shown with reference to FIGS. 7 to 24 an alternate linkage mechanism is disclosed. As with the prior embodiments, the decorative dispenser cover 510 generally comprises a fixed frame member 512 and a rotating frame member 514. While the decorative dispenser cover 510 is described herein for use in conjunction with a traditional beer tap 100, it is appreciated the decorative dispenser cover 510 could be used in conjunction with a variety of beverage dispensing systems. As explained above, a traditional beer tap 100 includes a faucet 102 and a flow actuator 104. The flow actuator 104 is pivotally mounted relative to the faucet 102 and is coupled to a valve mechanism 107 leading to the faucet 102. During operation of the beer tap 100, the user pulls the tap handle 105 causing the flow actuator 104 to move relative to the faucet 102. Once the flow actuator 104 is pulled fully forward, the valve is opened, and beer is dispensed through the faucet 102 via its outlet 106.

The fixed frame member 512 includes a fixed frame body member 516 of an aesthetically pleasing appearance. In accordance with the disclosed embodiment, it is a skull, although a variety of other designs could be used without departing from the spirit of invention. The fixed frame body member 516 is shaped and dimensioned to fit about the dispensing faucet 102 of the beer tap 100 and the flow actuator of the beverage dispenser faucet 102. The fixed frame body member 516 is formed in two parts, that is, a first fixed frame portion 550 that functions as the front portion of the fixed frame body member 516 and a second fixed frame portion 552 that functions as the rear portion of the fixed frame body member 516. The first fixed frame portion 550 and the second fixed frame portion 552 are constructed such that they may be coupled together in an orientation about the beer tap 100. In accordance with the disclosed embodiment, each of the first fixed frame portion 550 and the second fixed frame portion 552 includes an outwardly facing surface 550*a*, 552*a* and an inwardly facing coupling surface 550*b*, 552*b*. The inwardly facing coupling surfaces 550*b*, 552*b* of the first fixed frame portion 550 and the second fixed frame portion 552 are provided with magnets 554 that allow the first fixed frame portion 550 and the second fixed frame portion 552 to be selectively coupled. As such, and when fully assembled, the fixed frame body member 516 includes a first opening 523 allowing for access to the outlet 106 of the beer tap 100 and a second opening 524 for access to the flow actuator of the beer tap 100.

The fixed frame member 512 also includes coupling members for selectively attaching the fixed frame body member 516, and ultimately the decorative dispenser cover 510 itself, to the beer tap 100 in a self-supported manner allowing use thereof as described below. Secure attachment of the decorative dispensing cover 510 to the neck 110 of the faucet 102 is achieved via the provision of a universal insert 560 and a draw latch 562. Both the universal insert 560 and the draw latch 562 are secured to the second fixed frame portion 552 such that as the decorative dispensing cover 510, in particular, the fixed frame body member 516, is positioned on the upper surface of the neck 110 of the faucet 102, the draw latch 562 may be a wrapped around the neck 110 of the faucet 102 to securely attach the second fixed frame portion 552, as well as the remainder of the decorative dispensing cover 510, to the faucet 102 itself.

The draw latch 562 includes a first end 562*a* that is secured to a first side 564 of the second fixed frame portion 552 and a second end 562*b* that is selectively secured to and opposite second side 566 of the second fixed frame portion 552. The draw latch 562 is held in position via the provision of a plurality of draw latch connector pins 568 that are shaped and dimensioned to frictionally fit within aligned recesses (not shown) of the draw latch 562 and the second fixed frame portion 552. The central portion 574 of the draw latch 562 is provided with an arcuate shape allowing it to wrap around the neck 110 of the faucet 102 in a manner securing everything together.

As to the universal insert 560 it is simply positioned within the space defined between the first and second sides 564, 566 of the second fixed frame portion 552 and allow for enhanced connection when the draw latch 562 is positioned and secured to the second fixed frame portion 552.

The decorative dispenser cover 510 also includes the rotating frame member 514. The rotating frame member 514 is pivotally coupled to the fixed frame body member 516 such that the rotating frame member 514 moves in conjunction with movement of the flow actuator 104.

The rotating frame member 514 includes a rotating frame body member 526 of an aesthetically pleasing appearance. In accordance with the disclosed embodiment, the rotating frame body member 526 is in the form of a lower jaw, although other designs are certainly possible within the spirit of the present invention.

The rotating frame body member 526 is shaped and dimensioned to fit adjacent to the fixed frame body member 516 and rotate relative thereto. As such, the rotating frame body member 526 includes a first end 526*a* pivotally coupled to the fixed frame body member 516 and free second end 526*b* that moves relative to the remainder of the fixed frame body member 516. For example, and as briefly discussed above, the rotating frame body member 526 is formed in the shape of a lower jaw and is positioned adjacent the second opening 524 of the fixed frame body member 516, that is, the portion of the skull embodied by the fixed frame body member 516 that is replicating the upper jaw of the skull, such that the rotating frame body member 526 may move to reveal the outlet 106 of the faucet 102. The rotating frame body member 526 rotates relative to the fixed frame body member 516 between a closed first position where the free second end 526*b* of the rotating frame body member 526 is positioned adjacent to the fixed frame body member 516 in a manner substantially covering the first opening 523 and an open second position where the free second end of the rotating frame body member 526 is moved away from the fixed frame body member 516 to expose the first opening 523.

As briefly mentioned, the first end 526*a* of the rotating frame body member 526 is pivotally coupled, for example, via a hinge member 528, to the fixed frame body member 516. In particular, pivot pins 576 extend from opposite side of the rotating frame member 514 and are shaped and dimensioned for positioning within pivot apertures 578 formed in the first side 564 of the second fixed frame portion 552 and the second side 566 of the second fixed frame portion 552.

Controlled movement of the rotating frame body member 526 is facilitated by a linkage mechanism 530 that links the rotating frame body member 526 to the movement of the flow actuator (or knob lever) 104. Referring to the various figures, especially the exploded view of FIG. 7, the linkage mechanism 530 of the disclosed embodiment includes a knuckle housing (or coupling arm) 532 secured directly to the flow actuator (or knob lever) 104. The knuckle housing (or coupling arm) 532 includes a first end 532*a* and a second end 532*b*. The first end 532*a* includes a recess 580 shaped and dimensioned to receive the free end 104*a* of the flow actuator (or knob lever) 104 that controls the movement of the flow actuator (or knob lever) 104. As both the recess 580 and the flow actuator (or knob lever) 104 include a laterally oriented aperture 584, 586, a release pin 588 is used to releasable connect the knuckle housing (or coupling arm) 532 to the flow actuator (or knob lever) 104.

Also secured to the knuckle housing (or coupling arm) 532 is the tap handle 105. The second end 532*b* of the knuckle housing (or coupling arm) 532 is provided with a threaded aperture 590 shaped and dimensioned to receive a threaded rod connector 592. The threaded rod connector 592 also includes a first end 592*a* and a second end 592*b*. The first end 592*a* is threadingly secured to the knuckle housing (or coupling arm) 532 and the second end 592*b* extends away from the knuckle housing (or coupling arm) 532 and is adapted for secure and selective attachment to the tap handle 105 (for example, via a threaded coupling.

However, and considering the fact that the knuckle housing (or coupling arm) 532 is pivotally connected to the flow actuator (or knob lever) 104 via the release pin 588, movement of the tap handle 105 is not directly transferred to the flow actuator (or knob lever) 104. This is accomplished by the provision of plunger piston 594 selectively mounted within the knuckle housing (or coupling arm) 532. In particular, the plunger piston 594 is threadingly connected within the knuckle housing (or coupling arm) 532 such that the plunger piston 594 extends into the recess 580 sufficiently to contact the flow actuator (or knob lever) 104 when the tap handle 105 is rotated in a manner causing the knuckle housing (or coupling arm) 532 to rotate.

Also attached to the knuckle housing (or coupling arm) 532 is an actuating lever 596 that is secured to the knuckle housing (or coupling arm) 532 via an actuating lever connector 598. The actuating lever connector 598 includes a first end 598*a* secured to a side of the knuckle housing (or coupling arm) 532 via a resilient clip connection 600 and the second end 598*b* includes an aperture (not shown) for frictionally receiving the actuating lever 596. In this way, and as will be appreciated based upon the following disclosure, when the tap handle 105 is moved, the knuckle housing (or coupling arm) 532 is also moved in a manner causing the actuating lever connector 598 and the actuating lever 596 to move in a manner that ultimately results in the controlled movement of the rotating frame body member 526.

The free second end 596*b* of the actuating lever 596 includes a hook 602 shaped and dimensioned to engage an inwardly directed pin member 604 of the rotating frame body member 526 such that the rotating frame body member 526 is caused to rotate with the movement of the actuating lever 596, and ultimately with the movement of the tap handle 105 as it causes the knuckle housing (or coupling arm) 532 to rotate.

In use, as the tap handle 105 is drawn forward, the knuckle housing (or coupling arm) 532 and actuating lever arm 544 are caused to rotate while the flow actuator 104 remains stationary. The actuating lever arm 544 rotates in manner cause the rotating frame body member 526 to move to an opened position. The plunger piston 594 is oriented to eventually come into contact with the flow actuator (or knob lever) 104. When the plunger piston 594 comes into contact with the flow actuator (or knob lever) 104, the flow actuator 104 is caused to be pulled forward causing the flow of beverage from the faucet 102.

While the embodiments disclosed above present mechanisms for providing a moving decorative dispenser cover, various combinations of gears, levers, a combination of both, or something that is simpler and more efficient may be used to move the parts of the decorative dispenser cover. Similarly, the decorative dispenser cover may be constructed with multiple moving elements (for example, ears folding back, eyes squinting etc.). In making such modifications it is important to appreciate that the outlet for the beverage must be clear before the pour begins and close after the pour stops.

It should also be appreciated the decorative dispenser covers could be constructed to allow for interchangeable snap-on exterior objects that easily attach and connect to the underlying support structure. The universal nature of such a construction allows for any number of different decorative "skins" to be attached to change the appearance of the dispenser. It is also appreciated that the various parts of the decorative dispenser cover may get dripped on and are therefore assembled in a manner allowing the various parts to snap on and off or be designed for easy removal for easy cleaning. In addition, any parts that may meet the beverage being dispensed, should be made of NSF compliant materials.

As disclosed above, some embodiments may use magnets as catches for securing the decorative cover in open and closed positions. A torsion spring that has less force than the magnetic attachment may be used instead to open the rotating frame body member with a small amount of pressure applied to the front of the rotating frame body member to break the magnetic connection allowing the torsion spring to snap the rotating frame body member open and catch the rear magnet on the rotating frame body member on the magnet thus holding the rotating frame body member open until returned to the closed position through a second reverse action of a lever attached to the tap handle.

In accordance with additional embodiments utilizing magnets, closing the rotating frame body member may be achieved breaking the hold of the magnet by swinging the rotating frame body member away from the magnet and pushing it forward far enough to be caught in the field of the magnet at the front of the rotating frame body member thus being pulled into contact with the magnet and secured in the closed position. A backward lever motion could simplify the mechanism and the critical timing of the open and closing of the rotating frame body member in relation to the beginning and end of a pour.

A further embodiment could include a rachet wheel or gear that is cocked by the forward motion of a spring and held by a pawl or trigger. When the tap handle reaches the endpoint of the backward motion it activates a release/trigger that causes the rachet wheel to rotate clockwise engaging the rotating frame body member and pushing it forward until the rotating frame body member is caught in the magnetic field and pulled by the magnet into the closed position. The ratchet gear disengages from the rotating frame body member just as the magnet pulls the jaw into the locked position. It continues to rotate back to the start position to be re-cocked at the next forward motion of the tap handle. The snap open and close motions could be more aesthetically pleasing than a more measured close speed. If it is determined a slower close is more suitable, a governing wheel can be attached to the ratchet mechanism to slow the close.

Battery operated and lever switched electronic sound modules or light effects could also be provided and would be housed in the open spaces of the assembly.

The design of the base mechanical component should also consider future versions with additional connections to other motion components such as eyes opening and closing, ears folding back or perking up etc. As stated earlier, these are not dependent on the specific timing that the rotating frame body member is subject to as these parts will not meet the product.

Additional possibilities for different dispensing products include:

Slushie machines
Margarita Machine
Soft Serve Ice Cream
Milk Shakes
Seltzers
Soft Drinks
Water Dispensers
Wine Taps
Shot Dispenser
Dry Dispensers
Toppings i.e.: Candy Sprinkles, candy beads, dots, etc.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A decorative dispenser cover providing an aesthetically desirable accessory for use in conjunction with a beverage dispenser, comprising:

a fixed frame member includes a fixed frame body member shaped and dimensioned to fit about a dispensing faucet of a beverage dispenser, the fixed frame body member includes a first opening allowing for access to an outlet of the beverage dispenser and a second opening for access to a flow actuator and tap handle of the beverage dispenser, the fixed frame member also includes coupling members for selectively attaching the fixed frame body member, and ultimately the decorative dispenser cover itself, to the beverage dispenser in a self-supported manner allowing use thereof as described below;

a rotating frame member pivotally coupled to the fixed frame body member such that the rotating frame member moves in a coordinated manner, the rotating frame member includes a rotating frame body member of an aesthetically pleasing appearance, the rotating frame body member includes a first end pivotally coupled to the fixed frame body member and free second end that moves relative to the fixed frame body member; and a linkage mechanism controlling movement of the fixed frame body member relative to the rotating frame body member;

wherein the rotating frame body member rotates relative to the fixed frame body member between a first position and a second position.

2. The decorative dispenser cover according to claim 1, wherein the linkage mechanism includes a spring and gear mechanism that links the rotating frame body member to the movement of the flow actuator and tap handle.

3. The decorative dispenser cover according to claim 2, wherein the spring and gear mechanism of includes a torsion spring extending between the fixed frame body member and the rotating frame body member to bias the rotating frame body member to the first position.

4. The decorative dispenser cover according to claim 2, further including magnets and magnetic contacts positioned at specific locations along the respective rotating frame body member and the fixed frame body member such that the magnets and steel contacts are brought adjacent each other such that magnetic attraction therebetween causes the rotating frame body member to be held in position.

5. The decorative dispenser cover according to claim 2, wherein the spring and gear mechanism further includes a gearing system that controls movement of the rotating frame body member, the gearing system includes a drive lever having a first end selectively coupled to an actuating lever of the beverage dispenser and a second end with a linkage arm pivotally secured thereto for selectively controlling rotating frame body member.

6. The decorative dispenser cover according to claim 5, wherein the spring and gear mechanism further includes a driving gear connected to a rotating lever of the rotating frame member, and the rotating lever includes a first end secured to the rotating frame body member and a second end secured to the linkage arm, the second end of the drive lever moves between a first position when the actuating lever is back and a valve of the faucet is closed and a second position when the actuating lever is pulled forward and the valve of the faucet is opened.

7. The decorative dispenser cover according to claim 1, wherein the coupling members include a plurality of clips extending from a rear surface of the fixed frame body member.

8. The decorative dispenser cover according to claim 1, wherein the linkage mechanism includes a coupling arm secured directly to the flow actuator and a lever assembly.

9. The decorative dispenser cover according to claim 1, wherein the fixed frame body member includes a first fixed frame portion and a second fixed frame portion, wherein the first fixed frame portion and the second fixed frame portion are constructed such that they may be selectively coupled together.

10. The decorative dispenser cover according to claim 9, wherein inwardly facing coupling surfaces of the first fixed frame portion and the second fixed frame portion are provided with magnets that allow the first fixed frame portion and the second fixed frame portion to be selectively coupled.

11. The decorative dispenser cover according to claim 1, further including a universal insert and a draw latch providing for secure attachment of the decorative dispensing cover to a neck of the faucet.

12. The decorative dispenser cover according to claim 1, wherein the rotating frame body member includes a first end pivotally coupled to the fixed frame body member and free second end that moves relative to the fixed frame body member, the first end of the rotating frame body member includes pivot pins extending from opposite side of the rotating frame member, the pivot pins are shaped and dimensioned for positioning within pivot apertures of the fixed frame body member.

13. The decorative dispenser cover according to claim 1, wherein the linkage mechanism includes a coupling arm adapted for to be secured directly to the flow actuator, wherein the coupling arm includes a first end shaped and dimensioned to receive a free end of the flow actuator and a second end with a threaded aperture shaped and dimensioned to receive a threaded rod connector to which the tap handle is selectively secured.

14. The decorative dispenser cover according to claim 13, wherein the coupling arm and the flow actuator both include a laterally oriented aperture, and a release pin is used to releasable connect the coupling arm to the flow actuator.

15. The decorative dispenser cover according to claim 14, further including an actuating lever attached to the coupling arm via an actuating lever connector.

16. The decorative dispenser cover according to claim 15, wherein the actuating lever connector includes a first end secured to a side of the coupling arm via a resilient clip connection and a second end receiving the actuating lever.

17. The decorative dispenser cover according to claim 16, wherein the second end of the actuating lever includes a hook shaped and dimensioned to engage an inwardly directed pin member of the rotating frame body member such that the rotating frame body member is caused to rotate with the movement of the actuating lever, and ultimately with the movement of the tap handle as it causes the coupling arm to rotate.

* * * * *